Dec. 28, 1926.
H. BARTEN
KNIFE
Filed Nov. 18, 1925
1,611,988
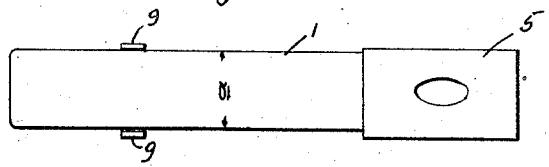
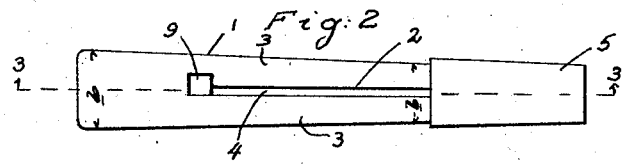
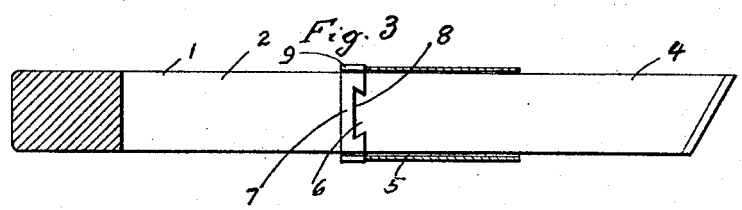
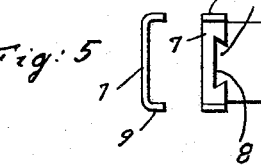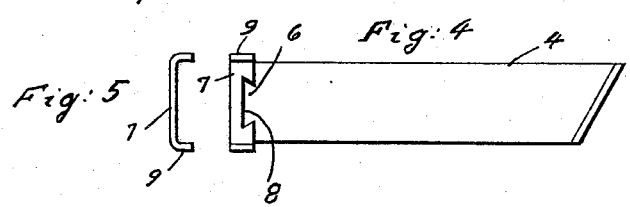
Hans Barten,
Inventor Patented Dec. 28, 1926.

1,611,988

UNITED STATES PATENT OFFICE.

HANS BARTEN, OF CHICAGO, ILLINOIS.

KNIFE.

Application filed November 18, 1925. Serial No. 69,838.

The invention relates to a knife and more particularly to a knife especially adapted for etching purposes as practiced in the art of photography.

One object of the invention is to provide a knife the blade whereof is slidably held in the handle and may be secured in any desired position relative thereto.

Another object of the invention is to provide a knife the blade whereof is detachably and exchangeably connected with the handle.

A further object of the invention is to provide a knife the effective length of the blade whereof may be selectively adjusted.

A still further object of the invention is to provide a knife the handle and the blade whereof are of equal width and are connected to each other in such a manner, that the blade may be slid longitudinally into the handle to be entirely covered thereby, said handle being provided with a spring clamp, whereby the knife may be fastened to a waistcoat pocket in the manner of a fountain pen.

A still further object of the invention is to provide a knife the handle whereof is made of one piece of material having an equal width over its whole length but being of tapering thickness.

A still further object of the invention is to provide a knife the handle whereof is bifurcated over the greater portion of its length.

Another object of the invention is to provide a knife the handle whereof is longitudinally slotted, said slot extending in the direction of the width of the handle entirely through said handle and in longitudinal direction over the greater portion of said handle.

Another object of the invention is to provide a knife the blade whereof is slidably positioned in the longitudinal slot of the handle.

Another object of the invention is to provide a knife the blade whereof is of the same width over substantially the whole length thereof as the handle, said blade having adjacent the rear end thereof lugs projecting at right angles from the top and bottom edge of said blade, the distance between the inner faces of said lugs being equal to the width of the handle, so that the lugs will slidingly engage the upper and lower edge of the bifurcated handle, thereby serving as guides for the blade when the same is slidingly moved relative to the handle.

A still further object of the invention is to provide a knife the blade whereof is detachably connected with a channel-shaped guide piece.

Other objects will be in part obvious and in part hereinafter set forth.

The invention accordingly consists in the features of construction, combination of elements, and arrangements of parts, which will be exemplified in the construction hereinafter described, it being understood that certain changes may be made that lie within the scope of the claims attached hereto and setting forth what is claimed as new.

In the drawing:

Fig. 1 is a side view of the knife, the blade being shown extended from the handle.

Fig. 2 is a top view of the knife, the blade being retracted into the handle.

Fig. 3 is a section substantially on line 3—3 of Fig. 2.

Fig. 4 is a side view of the blade shown connected to the channel-shaped guide piece.

Fig. 5 is an end view of the channel-shaped guide piece.

The handle of the knife may be made from one piece of bakelite or any other suitable material. The width $a$ of said handle is the same over the whole length thereof. The thickness of the handle is indicated at $b$ and it is to be noted that the handle tapers uniformly from one end thereof to the other.

A slot 2 extends longitudinally of the handle from the smaller end thereof over the greater portion of its length and throughout the whole width thereof, so that two clamping plates 3 are formed on said handle. The slot is preferably arranged to extend centrally of said handle, so that the clamping plates will be of equal formation.

A blade 4 is of equal width as the handle. The length of the blade is such, that the slot 2 can receive the entire blade and the thickness of the blade is such, that the faces of the blade slide snugly along the inner faces of the slot 2 in the handle.

A metal tube 5 fits snugly over the smaller end of the handle 1 and is adapted to be moved longitudinally thereof. If the tube is seated with its whole length on said handle it forces the two clamp plates toward each other and against the blade arranged therebetween so as to hold the blade against accidental movement relative to the handle. The walls of the tube are relatively thin.

A dove-tail lug is provided on the rear end of the blade. A plate 7 of the same thickness as the blade has a recess 8 therein corresponding to the dove-tail lug of the blade, so that the blade can be quickly and easily connected to and disconnected from the plate after both have been removed from the handle. The plate has ears or lugs 9 extending at right angles to the main portion of the plate. The distance between the inner faces of the lugs or ears is equal to the width of the blade and the handle, so that these ears will ride on the top and bottom edges of the handle, when the blade after being connected to said plate, is inserted between the clamping plates 3. The ears guide then the blade while it is being moved longitudinally of the handle. At the same time the ears serve as means for facilitating the adjusting of the blade relative to the handle.

A knife of the type described can be used to advantage for many purposes, but is especially well adapted for use as an etcher's knife in the photographic art. One of its advantages is, that the effective working length of the blade may be easily adjusted as desired. Another advantage is, that the knife is well balanced owing to the fact, that the handle and the blade are of equal width, and a still further advantage resides in the ease with which a blade may be removed or exchanged. Finally a blade may be used until it has been ground away to only a very short length.

If desired, a spring clasp of the type used in connection with fountain pens and the like may be attached to the heavier end of the handle, to secure the knife to a pocket.

Having described my invention, what I claim as new and wish to secure by Letters Patent is:

1. In a knife of the class described, a handle, a slot in said handle extending longitudinally thereof, a pair of clamping plates on the handle, said slot separating the plates, a blade arranged in said slot for sliding movement longitudinally of said handle, means for forcing the clamping plates toward each other and into engagement with the blade, said means being adapted to release the blade for sliding movement or removal, a guiding plate for said blade, a dove-tail recess in said plate and a dove-tail lug on the rear end of the blade adapted to engage into the dove-tail recess.

2. In a knife of the class described, a handle, a slot extending longitudinally of said handle, a pair of clamping plates in the handle and separated from each other by said slot, a blade arranged in said slot for sliding movement longitudinally of said slot, means for forcing the clamping plates toward each other and into engagement with the blade, said means being adapted to release the blade for sliding movement, a guiding plate for said blade removably connected with said blade and end flanges on said plate, said flanges extending at angles to the main portion of the plate, arranged outside of the slot and adapted to engage the top and bottom of the handle adjacent the slot therein.

3. In a knife of the class described, a handle, a pair of clamping plates on the handle, a blade slidingly movable between said plates, means for forcing the clamping plates into engagement with the blade, a guiding plate on the blade, and lugs on the guiding plate extending at right angles from said plate the width of the blade and the handle and the distance between the inner faces of the guiding lugs being substantially equal.

In witness whereof I affix my signature.

HANS BARTEN.